United States Patent
Itou

(10) Patent No.: US 12,158,443 B2
(45) Date of Patent: Dec. 3, 2024

(54) GAS SENSOR ELEMENT, AND GAS SENSOR

(71) Applicant: NGK SPARK PLUG CO., LTD., Aichi (JP)

(72) Inventor: Kazuma Itou, Nagoya (JP)

(73) Assignee: NITERRA CO., LTD., Nagoya (JP)

(*) Notice: Subject to any disclaimer, the term of this patent is extended or adjusted under 35 U.S.C. 154(b) by 316 days.

(21) Appl. No.: 16/956,008

(22) PCT Filed: Nov. 8, 2018

(86) PCT No.: PCT/JP2018/041529
§ 371 (c)(1),
(2) Date: Jun. 19, 2020

(87) PCT Pub. No.: WO2019/130849
PCT Pub. Date: Jul. 4, 2019

(65) Prior Publication Data
US 2021/0072180 A1 Mar. 11, 2021

(30) Foreign Application Priority Data
Dec. 28, 2017 (JP) ................................. 2017-253970

(51) Int. Cl.
*G01N 27/407* (2006.01)
*G01N 27/409* (2006.01)

(52) U.S. Cl.
CPC ..... *G01N 27/4075* (2013.01); *G01N 27/4077* (2013.01); *G01N 27/409* (2013.01)

(58) Field of Classification Search
CPC ........... G01N 27/4075; G01N 27/4077; G01N 27/409
See application file for complete search history.

(56) References Cited

U.S. PATENT DOCUMENTS 5,380,424 A * 1/1995 Friese ............... G01N 27/4075
204/429
5,538,612 A * 7/1996 Kojima ............. G01N 27/4075
204/429

(Continued)

FOREIGN PATENT DOCUMENTS

| JP | 6-504367 A | 5/1994 |
| JP | 2017-67511 A | 4/2017 |
| JP | 2017-223495 A | 12/2017 |

OTHER PUBLICATIONS

Rhodium, PubChem (2021) (Year: 2021).*

(Continued)

*Primary Examiner* — James Lin
*Assistant Examiner* — Vivian A Tran
(74) *Attorney, Agent, or Firm* — Sughrue Mion, PLLC

(57) ABSTRACT

This gas sensor element is provided with a solid electrolyte body having oxygen ion conductivity, a measurement electrode that is disposed on the solid electrolyte body and is exposed to a gas to be measured, and a reference electrode that is disposed on the solid electrolyte body and is exposed to a reference gas. The gas sensor element detects a specific gas included in the gas to be measured. The gas sensor element is provided with a contact layer formed so as to cover at least part of the measurement electrode. The contact layer includes rhodium and at least one precious metal other than rhodium. Additionally, the rhodium content in the contact layer relative to the total amount of precious metals included in the contact layer is at least 30 mol % and less than 100 mol %.

3 Claims, 6 Drawing Sheets

(56) References Cited

U.S. PATENT DOCUMENTS

| | | | |
|---|---|---|---|
| 6,787,014 B2* | 9/2004 | Hasei | G01N 27/4074 |
| | | | 204/429 |
| 2002/0060152 A1* | 5/2002 | Hotta | G01N 27/4077 |
| | | | 204/429 |
| 2002/0108856 A1* | 8/2002 | Kunimoto | G01N 27/4071 |
| | | | 204/425 |
| 2006/0024202 A1* | 2/2006 | Atsumi | G01N 27/4075 |
| | | | 422/78 |
| 2007/0151851 A1* | 7/2007 | Tanaka | G01N 27/4071 |
| | | | 204/431 |
| 2010/0270154 A1 | 10/2010 | Suzuki et al. | |
| 2011/0278169 A1* | 11/2011 | Su | G01N 27/4077 |
| | | | 204/408 |
| 2018/0238826 A1* | 8/2018 | Ujiyama | F01N 11/007 |

OTHER PUBLICATIONS

Platinum, PubChem (2021) (Year: 2021).*
International Search Report (PCT/ISA/210) issued Jan. 29, 2019 by the International Searching Authority in counterpart international Patent Application No. PCT/JP2018/041529.
Communication dated Jun. 13, 2022 issued by the Indian Patent Office in corresponding Indian Application No. 202017023828.

* cited by examiner

[FIG.1]
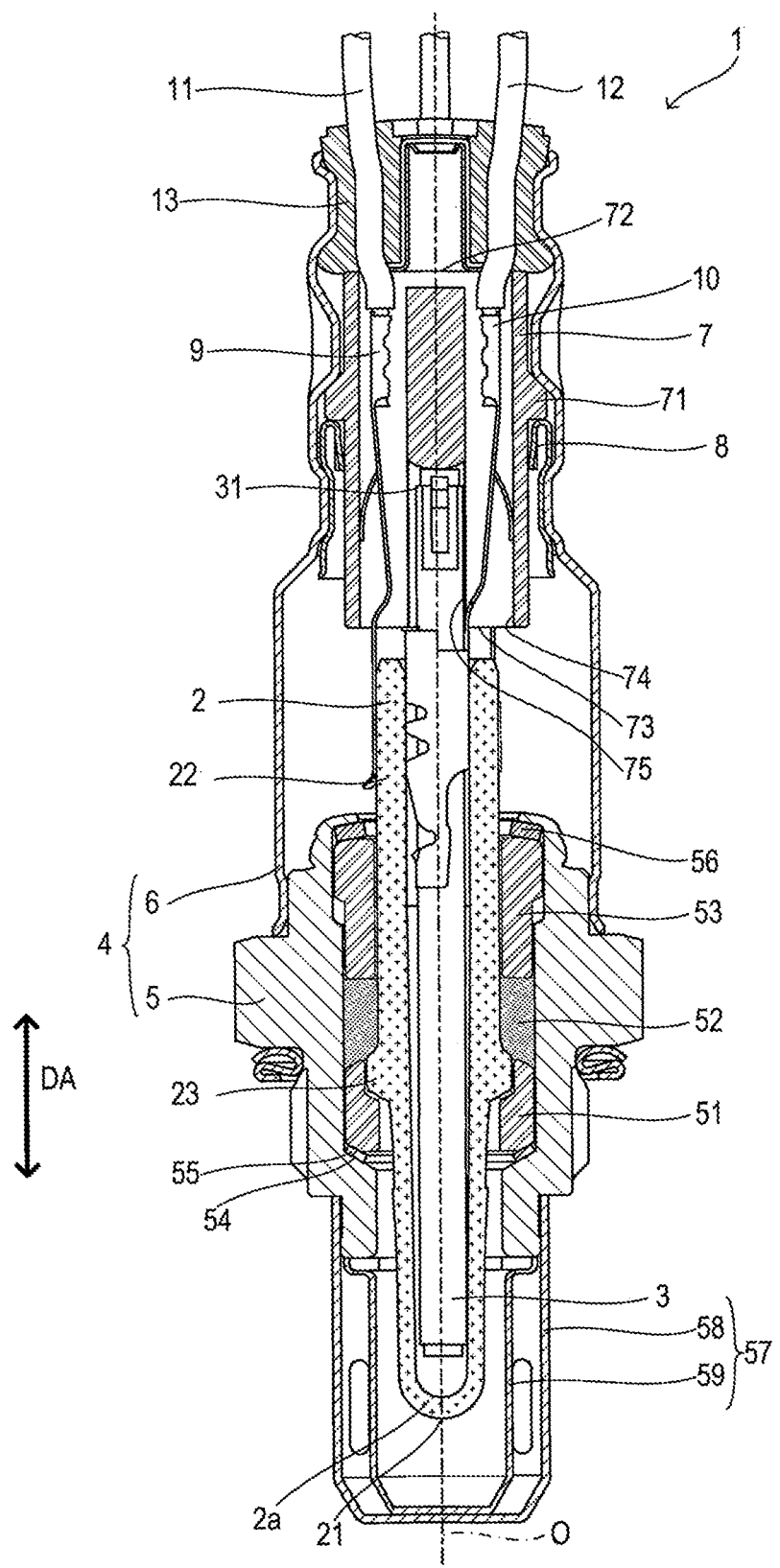

[FIG.2]
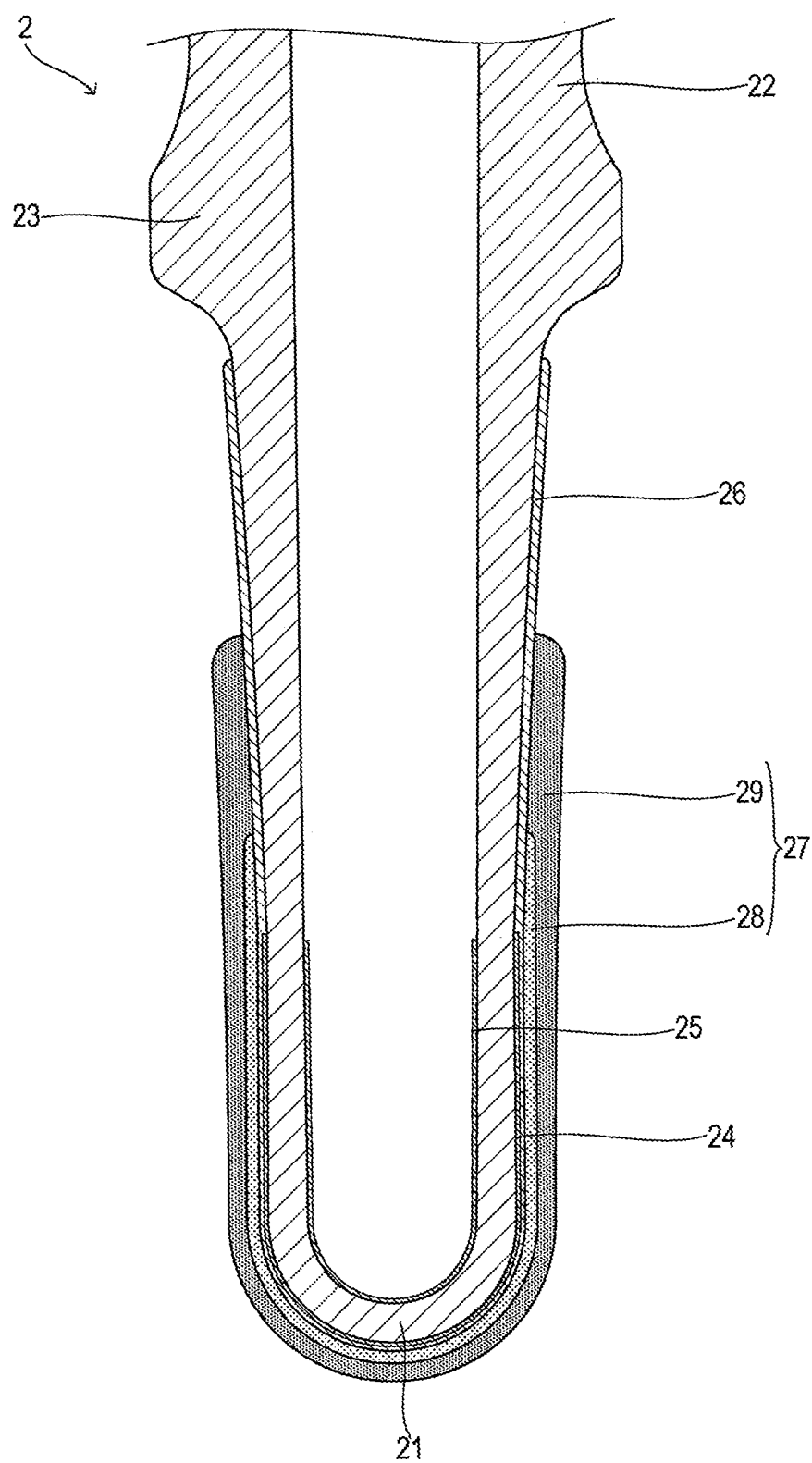

[FIG.3]
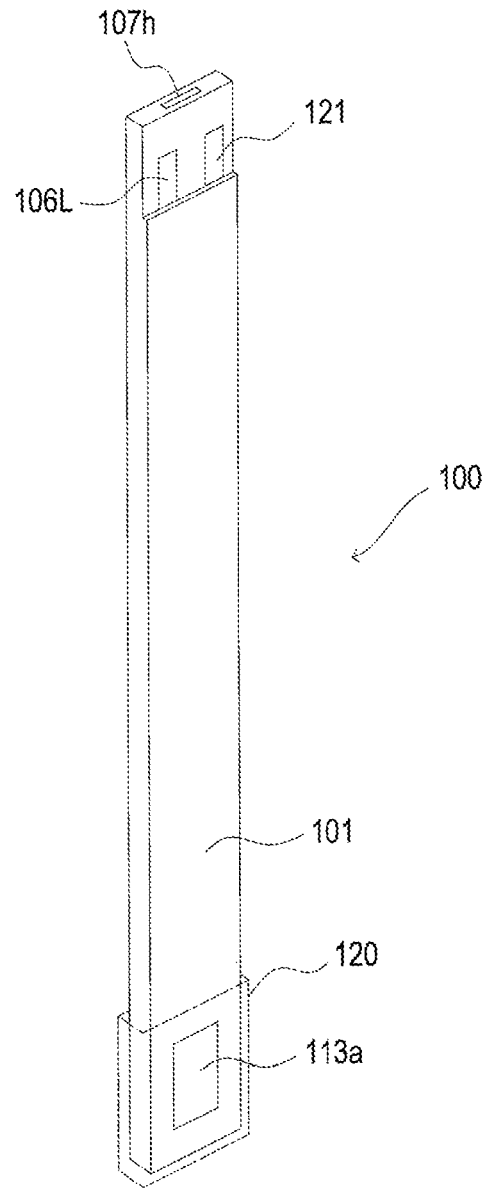

[FIG.4]
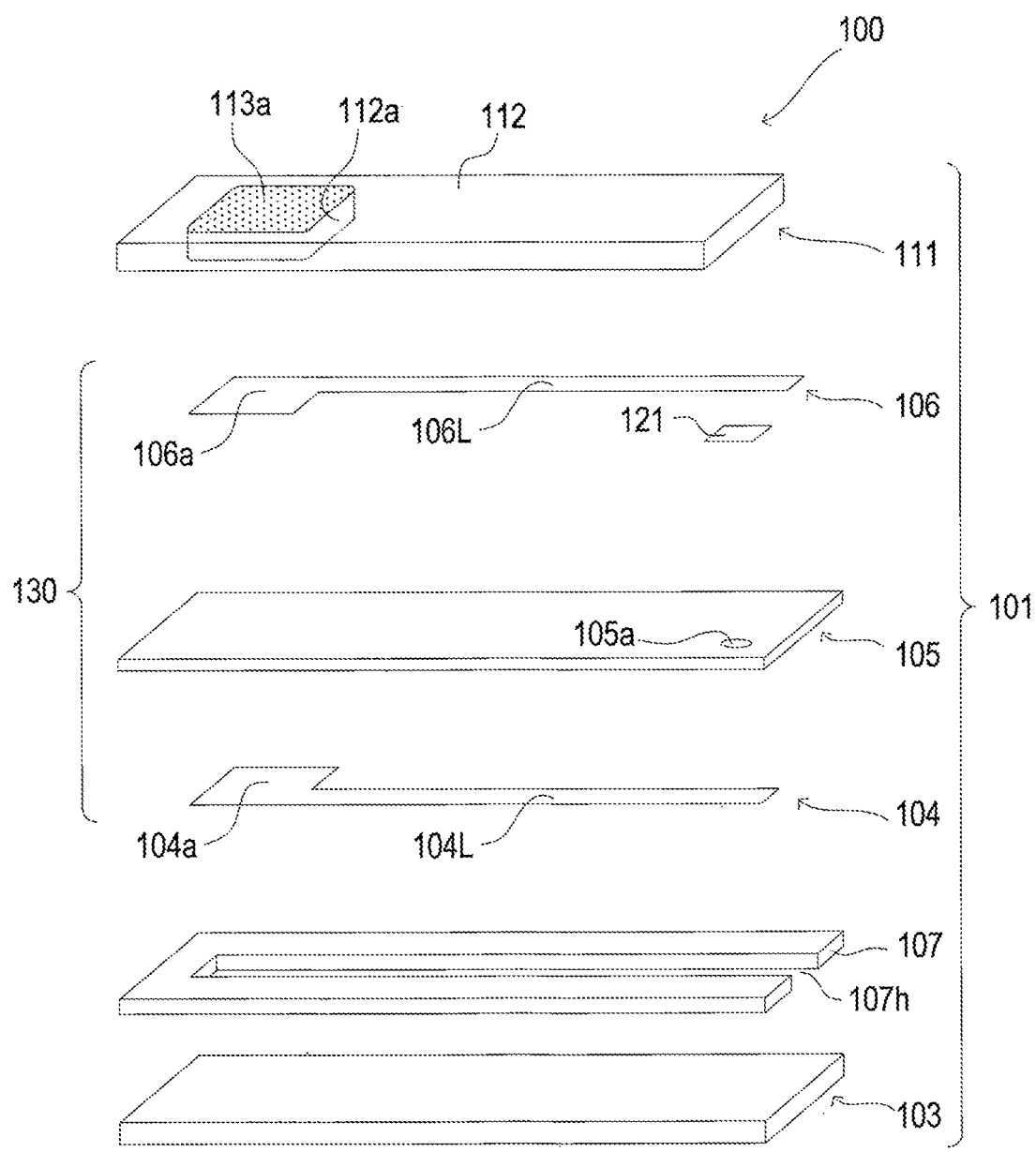

[FIG.5]
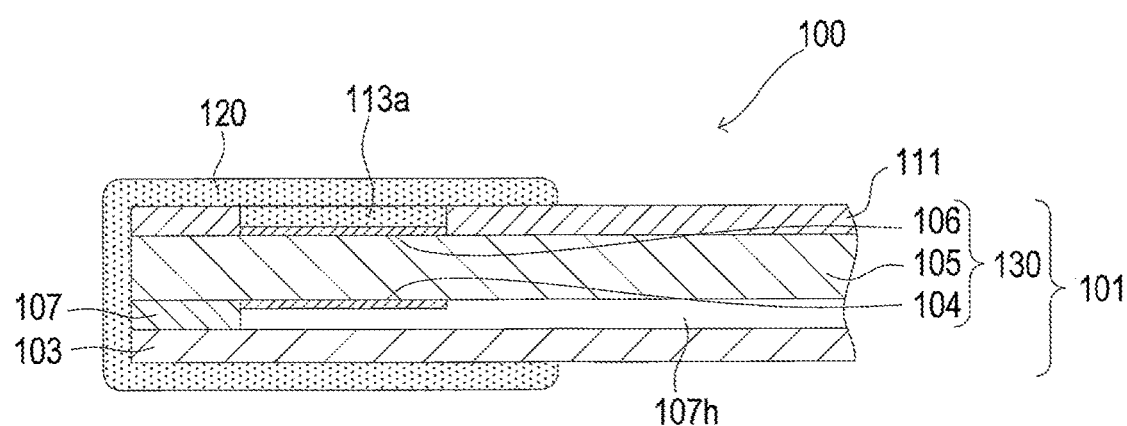

[FIG.6]
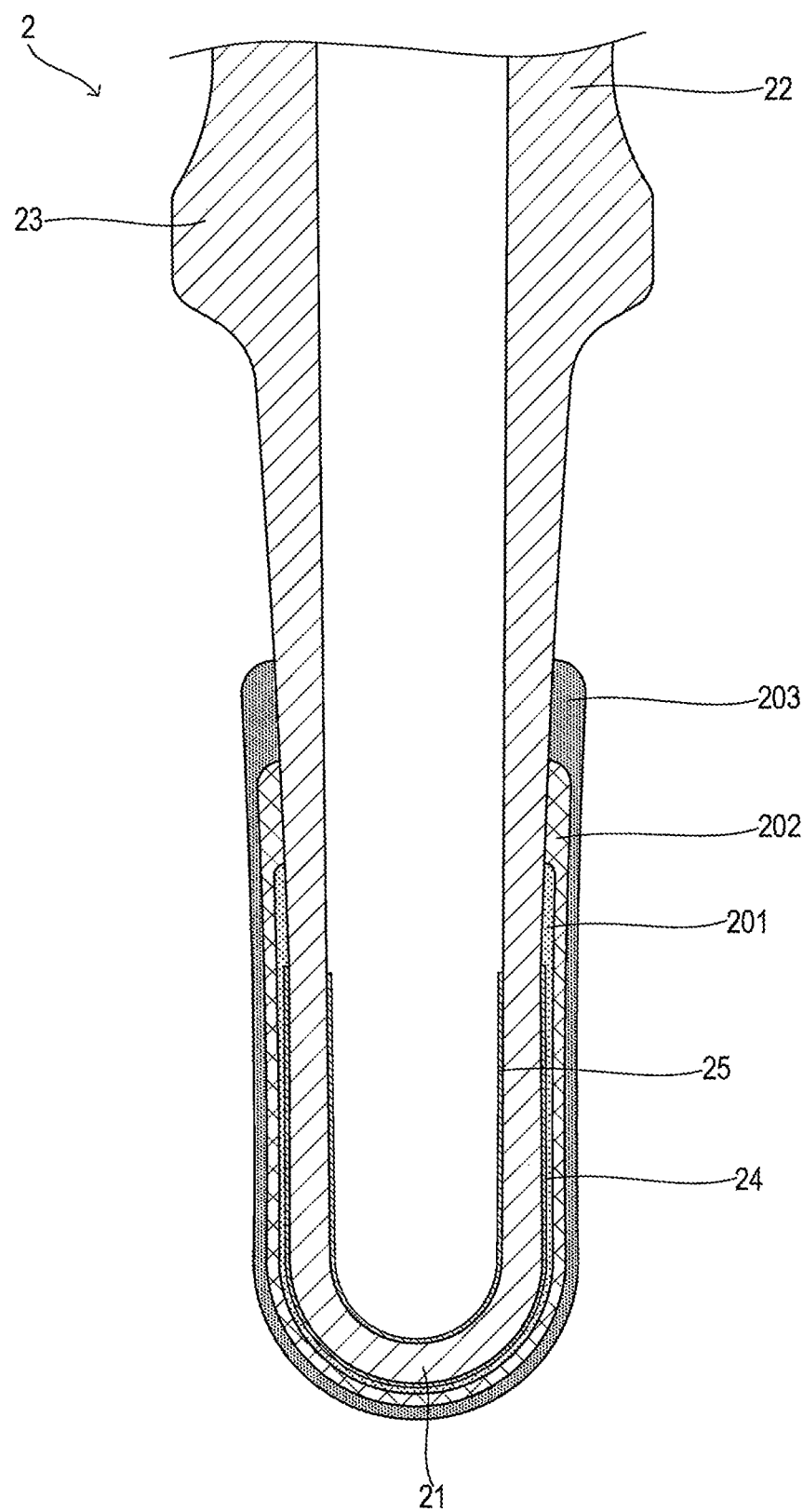

GAS SENSOR ELEMENT, AND GAS SENSOR

CROSS REFERENCE TO RELATED APPLICATIONS

This application is a national stage of International Application No. PCT/2018/041529 filed Nov. 8, 2018, claiming priority from Japanese Patent Application No. 2017-253970 filed Dec. 28, 2017 which is incorporated herein by reference in its entirety.

TECHNICAL FIELD

The present disclosure relates to a gas sensor element including a solid electrolyte body and a pair of electrodes and to a gas sensor.

BACKGROUND ART

Patent Document 1 describes a gas sensor element including a solid electrolyte body extending in the axial direction, a detection electrode and a reference electrode that are disposed on the solid electrolyte body, and a catalyst layer that covers at least part of the detection electrode.

PRIOR ART DOCUMENT

Patent Document

Patent Document 1: Japanese Patent Application Laid-Open (kokai) No. 2017-67511

SUMMARY OF THE INVENTION

Problem to be Solved by the Invention

A problem with the gas sensor element including the catalyst layer described in Patent Document 1 is that a decrease in the sensor output of the gas sensor element occurs after long-term use of the gas sensor element.

Means for Solving the Problems

One mode of the present disclosure is a gas sensor element for detecting a specific gas contained in a subject gas, the gas sensor element including: a solid electrolyte body containing $ZrO_2$ having oxygen ion conductivity; a measurement electrode disposed on the solid electrolyte body so as to be exposed to the subject gas; and a reference electrode disposed on the solid electrolyte body so as to be exposed to a reference gas.

The gas sensor element of the present disclosure further includes a catalyst layer formed so as to cover at least part of the measurement electrode. The catalyst layer contains rhodium and at least one noble metal other than rhodium. In the catalyst layer, the content of rhodium relative to the total amount of the noble metals contained in the catalyst layer is 30 mol % or more and less than 100 mol %, preferably from 55 mol % to 90 mol % inclusive, and more preferably from 60 mol % to 85 mol % inclusive.

In the gas sensor element of the present disclosure configured as described above, a decrease in sensor output due to long-term use of the gas sensor element is prevented, so that the durability of the gas sensor element can be improved.

In the one mode of the present disclosure, the gas sensor element may comprise a porous protective layer that covers at least part of the catalyst layer. By virtue of this, in this gas sensor element of the present disclosure, the catalyst layer can be prevented from direct exposure to the subject gas, and deterioration of the catalyst layer can thereby be prevented.

Another mode of the present disclosure is a gas sensor comprising the gas sensor element of the first mode of the present disclosure; and a holding member that holds the gas sensor element.

The gas sensor of the present disclosure configured as described above includes the gas sensor element of the one mode of the present disclosure, and the same effects as those of the gas sensor element of the present disclosure can be obtained.

BRIEF DESCRIPTION OF THE DRAWINGS

FIG. 1 Cross-sectional view showing the structure of an oxygen sensor of a first embodiment.

FIG. 2 Partial cross-sectional view showing the structure of a gas sensor element of the first embodiment.

FIG. 3 Perspective view of a plate-shaped gas sensor element of a second embodiment.

FIG. 4 Schematic exploded perspective view of the plate-shaped gas sensor element of the second embodiment.

FIG. 5 Partially enlarged cross-sectional view of the forward end side of the plate-shaped gas sensor element of the second embodiment.

FIG. 6 Partial cross-sectional view showing the structure of a gas sensor element of another embodiment.

DESCRIPTION OF REFERENCE NUMERALS

2: gas sensor element, 22: element body, 24: outer electrode, 25: inner electrode, 29: outer protective layer, 100: plate-shaped gas sensor element, 104: reference electrode, 105: solid electrolyte body, 106: measurement electrode, 120: porous protective layer, 202: catalyst layer

MODES FOR CARRYING OUT THE INVENTION

First Embodiment

A first embodiment of the present disclosure will be described with reference to the drawings.

As shown in FIG. 1, an oxygen sensor 1 of the present embodiment includes a gas sensor element 2, a ceramic heater 3, and a casing 4. In FIG. 1, the oxygen sensor 1 is shown such that its forward end side is located on the lower side and its rear end side is located on the upper side.

The gas sensor element 2 is made of a solid electrolyte containing $ZrO_2$ as a main component and is formed into the shape of a closed-end tube extending in the direction of an axial line O (hereinafter referred to as an axial direction DA) and having a closed forward end. The ceramic heater 3 is formed into a rod-like shape and disposed inside the gas sensor element 2 to heat the gas sensor element 2. The casing 4 is a member that houses an internal component of the oxygen sensor 1 and is used to fix the oxygen sensor 1 to an attachment portion such as an exhaust pipe of a vehicle.

The casing 4 includes a metallic shell 5 that holds the gas sensor element 2 such that a detection portion 2a at the forward end of the gas sensor element 2 can protrude into the exhaust pipe etc., and an outer tube 6 that extends upward from the metallic shell 5 and forms a reference gas space between the outer tube 6 and the gas sensor element 2.

The metallic shell 5 has a cylindrical main body. The metallic shell 5 houses a support member 51 that supports the gas sensor element 2 from below, a filling member 52 composed of talc powder charged into a space above the support member 51, a sleeve 53 that presses the filling member 52 from above, etc.

Specifically, a step portion 54 protruding inwardly is provided on the inner circumferential surface of a forward end portion of the metallic shell 5, and the support member 51 is supported by the step portion 54 through a packing 55, whereby the gas sensor element 2 is supported from the lower side. The filling member 52 is disposed between the inner circumferential surface of the metallic shell 5 and the outer circumferential surface of the gas sensor element 2 to be located on the upper side of the support member 51. The tubular sleeve 53 and a packing 56 are sequentially inserted coaxially on the upper side of the filling member 52, and then a rear end portion of the metallic shell 5 is crimped inwardly (i.e., downward in FIG. 1). The filling member 52 is thereby compressed, so that the gas sensor element 2 is firmly fixed to the metallic shell 5.

A metallic protector 57 that covers a protruding portion of the gas sensor element 2 and has a plurality of holes is welded to the outer circumferential surface of a forward end portion of the metallic shell 5. The protector 57 has a double structure including an outer protector 58 and an inner protector 59. The outer protector 58 having a closed-end cylindrical shape is disposed on the outer side, and the inner protector 59 having a closed-end cylindrical shape is disposed on the inner side.

The outer tube 6 is welded to the metallic shell 5 in a state in which an upper portion of the metallic shell 5 is fitted into a forward end opening of the outer tube 6, whereby the outer tube 6 is attached to the metallic shell 5.

A ceramic-made insulating separator 7 formed into a tubular shape is inserted into the outer tube 6 such that the insulating separator 7 is located near a rear end opening of the outer tube 6.

The separator 7 has a flange portion 71 protruding radially outward from the outer circumferential surface of the separator 7 at a position near the center with respect to the axial direction thereof. The separator 7 is held inside the outer tube 6 through a metallic tubular holding member 8 engaged with the flange portion 71.

The separator 7 has a plurality of insertion holes 74 that extend therethrough from its rear end surface 72 toward its forward end surface 73, and a recess 75 formed on the forward end surface 73 so as to be capable of receiving a rear end portion 31 of the ceramic heater 3. A metallic terminal 9 extends from the outer circumferential surface of the rear end of the gas sensor element 2 to the forward end of a lead wire 11, and a metallic terminal 10 extends from the inner circumferential surface of the rear end of the gas sensor element 2 to the forward end of a lead wire 12. The metallic terminals 9 and 10 are housed in the respective insertion holes 74 of the separator 7, and insulation between the metallic terminal 9 and the metallic terminal 10 and the insulation between the outer tube 6 and the metallic terminals 9 and 10 are thereby provided.

The rear opening of the outer tube 6 is closed by a grommet 13 made of a fluorine-based resin, and the lead wires 11 and 12 are disposed so as to pass through the grommet 13.

The gas sensor element 2 includes a cylindrical closed-end element body 22 having a closed forward end portion 21 and extending in the axial direction DA.

An element flange portion 23 extending circumferentially protrudes radially outward from the outer circumferential surface of the element body 22.

As shown in FIG. 2, at the forward end portion 21 of the gas sensor element 2, an outer electrode 24 is formed on the outer circumferential surface of the element body 22. The outer electrode 24 is a porous electrode formed of Pt or a Pt alloy. An unillustrated lead portion extending from the outer electrode 24 toward the rear end of the gas sensor element 2 is formed on the outer circumferential surface of the element body 22.

At the forward end portion 21 of the gas sensor element 2, an inner electrode 25 is formed on the inner circumferential surface of the element body 22. The inner electrode 25 is a porous electrode formed of Pt or a Pt alloy. An unillustrated lead portion extending from the inner electrode 25 toward the rear end of the gas sensor element 2 is formed on the inner circumferential surface of the element body 22.

The outer electrode 24 and the inner electrode 25 are disposed so as to sandwich the element body 22 therebetween at the forward end portion 21 of the gas sensor element 2. The element body 22 and the pair of electrodes (i.e., the outer electrode 24 and the inner electrode 25) form an oxygen concentration cell that generates an electromotive force according to the concentration of oxygen in the exhaust gas. Specifically, at the forward end portion 21 of the gas sensor element 2, the outer electrode 24 is exposed to the exhaust gas, and the inner electrode 25 is exposed to the reference gas. The gas sensor element 2 thereby detects the concentration of oxygen in the exhaust gas.

A gas limiting layer 26 that covers the outer electrode 24 is formed on the outer circumferential surface of the element body 22 in a region extending from the forward end portion 21 of the gas sensor element 2 to a point near the element flange portion 23. The gas limiting layer 26 is a porous layer formed of a ceramic such as spinel and is formed by thermal spraying. The gas limiting layer 26 limits the amount of the exhaust gas flowing into the outer electrode 24.

At the forward end portion 21 of the gas sensor element 2, a porous protective layer 27 that covers the outer electrode 24 is formed on the outer circumferential surface of the element body 22, with the gas limiting layer 26 intervening therebetween. The porous protective layer 27 includes an inner protective layer 28 and an outer protective layer 29.

The inner protective layer 28 is formed so as to extend from the forward end portion 21 of the gas sensor element 2 to a point rearward of the outer electrode 24. The inner protective layer 28 may be formed, for example, by binding together particles of at least one ceramic selected from the group consisting of alumina, spinel, zirconia, mullite, zircon, and cordierite by firing.

The outer protective layer 29 is formed so as to extend from the forward end portion 21 of the gas sensor element 2 to a point rearward of the inner protective layer 28 and cover the inner protective layer 28. The outer protective layer 29 is formed, for example, by firing particles of at least one ceramic selected from the group consisting of alumina, spinel, zirconia, mullite, zircon, and cordierite.

The outer protective layer 29 contains platinum (Pt) and rhodium (Rh). Platinum and rhodium serve as catalysts for facilitating combustion of unburned gas components contained in the exhaust gas. When both platinum and rhodium are contained in the single outer protective layer 29, the outer protective layer 29 can have two catalytic functions, i.e., the oxidizing ability of platinum and the reducing ability of rhodium. The content of rhodium relative to the total amount of the noble metals (i.e., platinum and rhodium) in the outer protective layer 29 is 30 mol % or more and less than 100 mol %, preferably from 55 mol % to 90 mol % inclusive, and more preferably from 60 mol % to 85 mol % inclusive.

Next, a method for producing the gas sensor element 2 will be described.

In a first step, a slurry of the material of the element body 22, i.e., a solid electrolyte (e.g., partially stabilized zirconia containing zirconia ($ZrO_2$) and 5 mol % of yttria ($Y_2O_3$) added thereto), is prepared. The slurry is dried and granulated by spray drying to obtain a material powder. The material powder is subjected to press working and then machined to obtain a green compact. The green compact is fired at, for example, 1,500° C. to obtain the element body 22.

In a second step, the inner electrode 25 is formed on the inner circumferential surface of the element body 22 by electroless plating. Then the outer electrode 24 is formed on the outer circumferential surface of the element body 22 by electroless plating.

In a third step, the gas limiting layer 26 is formed by thermal spraying so as to cover the outer electrode 24.

In a fourth step, a paste containing the material of the inner protective layer 28 is applied to the gas limiting layer 26 and fired. Then a paste containing the material of the outer protective layer 29 is applied to the inner protective layer 28 and fired.

In a fifth step, a portion of the element body 22 where the outer protective layer 29 is formed is immersed in a solution mixture prepared by mixing an Rh solution and a Pt solution and is then subjected to drying processing and a firing step.

Through the above steps, the gas sensor element 2 can be produced.

It is well known that platinum and rhodium serve as catalysts that facilitate combustion of unburned gas. However, a problem with these catalysts is deterioration of their catalytic functions during use of the gas sensor. The present inventor has conducted extensive studies and found that, when rhodium and another noble metal other than rhodium are used as catalysts, the deterioration of the catalytic functions is related to the ratio of the amount of rhodium to the total amount of the noble metals. A description will next be given of an evaluation test for evaluating the sensor output from the gas sensor element 2 after an engine high-temperature durability test and the results of the test. The engine high-temperature durability test is a test in which the engine is operated at an engine speed of 3,400 rpm for 30 minutes and at an engine speed of 2,800 rpm for 20 minutes and is then idled (at an engine speed of 700 rpm) for 10 minutes. This operation is defined as one cycle, and a plurality of cycles are repeated. The test results after 50 test cycles are shown.

In the present test, a degraded catalyst was attached to an exhaust pipe of an automobile. The oxygen sensor 1 was attached to the exhaust pipe to be located on the downstream side of the degraded catalyst, and the sensor output from the oxygen sensor 1 when the excess air ratio λ was less than 1 (i.e., in a rich region) was measured.

In the present test, there were used gas sensor elements 2 in which the content of rhodium relative to the total amount of the noble metals in the outer protective layer 29 was set to 10, 20, 30, 40, 50, 55, 60, 65, 70, 80, 85, 90, or 95 mol %. A gas sensor element containing no Rh was used as a Comparative Example. The content of rhodium relative to the total amount of the noble metals was adjusted by changing the ratio of the Rh solution to the Pt solution in the solution mixture.

The results of evaluation of the sensor output after the engine high-temperature durability test are shown in Table 1. In Table 1 showing the evaluation results, when the sensor output from an oxygen sensor 1 after the engine high-temperature durability test in the rich condition did not decrease substantially from the sensor output before the engine high-temperature durability test, an "AA" rating was assigned to this oxygen sensor 1. When the decrease in output was found but was small, an "A" rating was assigned. When the decrease in output was found but was practically usable without any problem, a "B" rating was assigned. When the sensor output decreased to a practically problematic level, a "C" rating was assigned. The phrase "did not decrease substantially" means that the decrease in output is within sample-to-sample initial output variations, and the phrase "practically problematic" means that the decrease in output after the durability test with respect to the initial output is 10% or more. The phrase "the decrease in output was found but was small" means that the decrease in output after the durability test with respect to the initial output is less than 10%.

TABLE 1

| Sample No. | Comparative Example | Example 1 | Example 2 | Example 3 | Example 4 |
|---|---|---|---|---|---|
| Rh content [mol %] | 0 | 10 | 20 | 30 | 40 |
| Evaluation results | C | C | C | B | B |

| Sample No. | Example 5 | Example 6 | Example 7 | Example 8 | Example 9 |
|---|---|---|---|---|---|
| Rh content [mol %] | 50 | 55 | 60 | 65 | 70 |
| Evaluation results | B | A | AA | AA | AA |

| Sample No. | Example 10 | Example 11 | Example 12 | Example 13 |
|---|---|---|---|---|
| Rh content [mol %] | 80 | 85 | 90 | 95 |
| Evaluation results | AA | AA | A | B |

Each gas sensor element 2 used includes the element body 22 containing $ZrO_2$ having oxygen ion conductivity, the outer electrode 24 disposed on the element body 22 and exposed to the exhaust gas, and the inner electrode 25 disposed on the element body 22 and exposed to the reference gas and further includes the outer protective layer 29 formed so as to cover the outer electrode 24. As can be seen from the results in Table 1, Examples 7 to 11 in which the outer protective layer 29 contained rhodium and platinum and the content of rhodium relative to the total amount of the noble metals was from 60 mol % to 85 mol % inclusive were rated as AA, and their durabilities were found to be excellent. Example 6 in which the rhodium content was 55 mol % and Example 12 in which the rhodium content was 90 mol % were rated as A, and their durabilities were found to be good. Examples 3 to 5 in which the rhodium content was from 30 mol % to 50 mol % inclusive and Example 13 in which the rhodium content was 95 mol % were rated as B, and they were found not to cause any practical problem. However, Comparative Example in which no rhodium was contained and Examples 1 and 2 in which the rhodium content was from 10 mol % to 20 mol % inclusive were rated as C, and their durabilities were found to be poor.

As can be seen from the above results, the content of rhodium relative to the total amount of the noble metals contained in the catalyst layer is 30 mol % or more and less than 100 mol %, preferably from 55 mol % to 90 mol % inclusive, and more preferably from 60 mol % to 85 mol % inclusive.

In the gas sensor element 2 configured as described above, a decrease in sensor output due to long-term use of the gas sensor element 2 is prevented, and the durability of the gas sensor element 2 can be improved.

In the embodiment described above, the element body 22 corresponds to the solid electrolyte body, and the outer electrode 24 corresponds to the measurement electrode. The inner electrode 25 corresponds to the reference electrode, and the exhaust gas corresponds to the subject gas. Oxygen gas corresponds to the specific gas, and the outer protective layer 29 corresponds to the catalyst layer.

Second Embodiment

A second embodiment of the present disclosure will be described with reference to the drawings.

As shown in FIG. 3, a plate-shaped gas sensor element 100 of the present embodiment includes an element body 101 and a porous protective layer 120.

As shown in FIG. 4, the element body 101 includes an oxygen concentration detection cell 130, a reinforcing protective layer 111, an air introduction hole layer 107, and a lower surface layer 103. In FIG. 4, the illustration of the porous protective layer 120 is omitted.

The oxygen concentration detection cell 130 includes a reference electrode 104, a solid electrolyte body 105, and a measurement electrode 106. The reference electrode 104 and the measurement electrode 106 are disposed so as to sandwich the solid electrolyte body 105 therebetween.

The reference electrode 104 includes a reference electrode portion 104a and a reference lead portion 104L. The reference lead portion 104L is formed so as to extend from the reference electrode portion 104a in the longitudinal direction of the solid electrolyte body 105.

The measurement electrode 106 includes a measurement electrode portion 106a and a detection lead portion 106L. The detection lead portion 106L is formed so as to extend from the measurement electrode portion 106a in the longitudinal direction of the solid electrolyte body 105.

The reinforcing protective layer 111 includes a reinforcing portion 112 and an electrode protecting portion 113a.

The reinforcing portion 112 is a plate-shaped member for protecting the solid electrolyte body 105 with the detection lead portion 106L sandwiched between the reinforcing portion 112 and the solid electrolyte body 105. The reinforcing portion 112 is formed of the same material as the material of the solid electrolyte body 105 and has a protecting portion placement space 112a that extends through the reinforcing portion 112 in its thickness direction.

The electrode protecting portion 113a is formed of a porous material and disposed in the protecting portion placement space 112a. The electrode protecting portion 113a protects the measurement electrode portion 106a with the measurement electrode portion 106a sandwiched between the electrode protecting portion 113a and the solid electrolyte body 105.

The plate-shaped gas sensor element 100 of the present embodiment is a so-called oxygen concentration electromotive force-type gas sensor which allows detection of the oxygen concentration using the value of voltage (i.e., electromotive force) generated between the electrodes of the oxygen concentration detection cell 130.

The lower surface layer 103 and the air introduction hole layer 107 are stacked on the reference electrode 104 such that the reference electrode 104 is sandwiched between the air introduction hole layer 107 and the solid electrolyte body 105. The air introduction hole layer 107 has an approximately U-shape with an opening toward the rear end side. An inner space surrounded by the solid electrolyte body 105, the air introduction hole layer 107, and the lower surface layer 103 forms an air introduction hole 107h. The reference electrode 104 is disposed so as to be exposed to air introduced into the air introduction hole 107h.

As described above, the element body 101 is a layered body formed by staking the lower surface layer 103, the air introduction hole layer 107, the reference electrode 104, the solid electrolyte body 105, the measurement electrode 106, and the reinforcing protective layer 111. The element body 101 has a plate-like shape.

The terminal end of the reference lead portion 104L is electrically connected to a detection element-side pad 121 on the solid electrolyte body 105 through a conductor formed in a through hole 105a formed in the solid electrolyte body 105. The rear end of the reinforcing protective layer 111 is located closer to the forward end side of the plate-shaped gas sensor element in the axial direction (i.e., in the horizontal direction in FIG. 4) than the terminal end of the detection lead portion 106L is. The detection element-side pad 121 and the terminal end of the detection lead portion 106L are exposed to the outside at the rear end of the reinforcing protective layer 111 and are electrically connected to unillustrated external terminals for connection to an external circuit.

As shown in FIG. 3, the porous protective layer 120 is disposed so as to cover the entire circumference of a forward end portion of the element body 101.

As shown in FIG. 5, the porous protective layer 120 is formed so as to contain the forward end surface of the element body 101 and extend rearward in the axial direction (i.e., the horizontal direction in FIG. 5).

Moreover, the porous protective layer 120 is formed so as to axially cover a region including at least the reference electrode portion 104a and the measurement electrode portion 106a of the element body 101.

The plate-shaped gas sensor element 100 may be exposed to poisoning materials such as silicon and phosphorus contained in exhaust gas, and water droplets in the exhaust gas may adhere to the plate-shaped gas sensor element 100. By covering the outer surface of the plate-shaped gas sensor element 100 with the porous protective layer 120, the poisoning materials can be trapped, and direct contact of water droplets with the plate-shaped gas sensor element 100 can be prevented.

The solid electrolyte body 105 is formed of a partially stabilized zirconia sintered body prepared by adding yttria ($Y_2O_3$) or calcia (CaO) serving as a stabilizer to zirconia ($ZrO_2$). The solid electrolyte body 105 is formed of zirconia as a main component, and 50 to 83.3% by mass of the zirconia is tetragonal zirconia.

The reference electrode 104 and the measurement electrode 106 each contain Pt as a main component and include monoclinic zirconia. The reference electrode 104 and the measurement electrode 106 may contain a ceramic component.

The "main component" is a component contained in an amount exceeding 50% by mass relative to the total amount of the components forming the portion of interest (i.e., the solid electrolyte body 105, the measurement electrode 106, etc.).

At least a portion of the porous protective layer 120 that covers the measurement electrode 106 is formed of spinel ($MgAl_2O_4$) and titania ($TiO_2$) and contains platinum (Pt) and rhodium (Rh). In the porous protective layer 120, the content of rhodium relative to the total amount of the noble metals (i.e., platinum and rhodium) is 30 mol % or more and less than 100 mol %, preferably from 55 mol % to 90 mol % inclusive, and more preferably from 60 mol % to 85 mol % inclusive. The noble metals serve as catalysts for promoting combustion of unburned gas components contained in the exhaust gas. The "at least a portion of the porous protective layer 120 that covers the measurement electrode 106" is a portion overlapping the measurement electrode 106 in the stacking direction of the element body 101.

As described above, the plate-shaped gas sensor element 100 includes the solid electrolyte body 105 containing $ZrO_2$ having oxygen ion conductivity, the measurement electrode 106 disposed on the solid electrolyte body 105 so as to be exposed to the exhaust gas, and the reference electrode 104 disposed on the solid electrolyte body 105 so as to be exposed to air. The plate-shaped gas sensor element 100 detects oxygen contained in the exhaust gas.

The plate-shaped gas sensor element 100 includes the porous protective layer 120 formed so as to cover the measurement electrode 106. The porous protective layer 120 contains rhodium and platinum. In the porous protective layer 120, the content of rhodium relative to the total amount of the noble metals contained in the porous protective layer 120 is 30 mol % or more and less than 100 mol %, preferably from 55 mol % to 90 mol % inclusive, and more preferably from 60 mol % to 85 mol % inclusive.

In the plate-shaped gas sensor element 100 configured as described above, the same effects as those of the gas sensor element 2 of the first embodiment can be obtained.

In the embodiment described above, the plate-shaped gas sensor element 100 corresponds to the gas sensor element, and the solid electrolyte body 105 corresponds to the solid electrolyte body. The porous protective layer 120 corresponds to the catalyst layer.

The embodiments of the present disclosure have been described above, but the present disclosure is not limited to the above embodiments and can be embodied in various other forms.

For example, in the description of the first embodiment, the gas sensor includes the tubular gas sensor element. However, the gas sensor may include the plate-shaped gas sensor element of the second embodiment. The gas sensor including the plate-shaped gas sensor element is well known, and the description of its detailed structure is not repeated.

In the above embodiments, the oxygen concentration detection gas sensors have been described, but this is not a limitation. The gas sensor may detect, for example, NOx. In one of the above embodiments, the porous protective layer includes the inner protective layer and the outer protective layer, and the outer protective layer contains the catalysts, but this is not a limitation. For example, the inner protective layer may contain the catalysts, and both the inner and outer protective layers may contain the catalysts. The porous protective layer may be composed of one layer containing the catalysts. It is sufficient that the porous protective layer covers at least part of the measurement electrode without covering the entire outer circumferential surface of the gas sensor element.

In the mode shown in the first embodiment, the outer protective layer 29 contains platinum and rhodium. The noble metal other than rhodium may be a noble metal other than platinum. Examples of the noble metal other than platinum include palladium (Pd), ruthenium (Ru), and iridium (Ir). Palladium, ruthenium, and iridium have the same catalytic function as platinum. The outer protective layer 29 may contain two or more noble metals other than rhodium. For example, the outer protective layer 29 may contain platinum, palladium, and rhodium. The outer protective layer 29 may contain three or more noble metals including rhodium. In this case also, the same effects as those when rhodium and platinum are contained can be obtained when the content of rhodium relative to the total amount of the noble metals is specified within the range of the present disclosure.

In the mode shown in the first embodiment, the outer protective layer 29 contains platinum and rhodium. However, as shown in FIG. 6, a catalyst layer containing platinum and rhodium may be covered with a porous protective layer.

In a gas sensor element 2 shown in FIG. 6, the outer electrode 24, a gas limiting layer 201, a catalyst layer 202, and a porous protective layer 203 are formed on the outer circumferential surface of the element body 22.

The gas limiting layer 201 is a porous layer formed of a ceramic such as spinel, as is the gas limiting layer 26. The gas limiting layer 201 extends from the forward end portion 21 of the gas sensor element 2 to a point rearward of the outer electrode 24 so as to cover the outer electrode 24.

The catalyst layer 202 is a layer formed of metal oxide particles supporting noble metals and granules formed of the metal oxide particles supporting the noble metals. The catalyst layer 202 extends from the forward end portion 21 of the gas sensor element 2 to a point rearward of the gas limiting layer 201 so as to cover the gas limiting layer 201. The noble metals contained in the catalyst layer 202 are platinum and rhodium. In the catalyst layer 202, the content of rhodium relative to the total amount of the noble metals (i.e., platinum and rhodium) is 30 mol % or more and less than 100 mol %, preferably from 55 mol % to 90 mol % inclusive, and more preferably from 60 mol % to 85 mol % inclusive.

The porous protective layer 203 is formed so as to extend from the forward end portion 21 of the gas sensor element 2 to a point rearward of the catalyst layer 202. The porous protective layer 203 may be formed, for example, by binding particles of at least one ceramic selected from the group consisting of alumina, spinel, zirconia, mullite, zircon, and cordierite by firing.

The gas sensor element 2 configured as described above includes the porous protective layer 203 formed so as to cover the catalyst layer 202 and allow the exhaust gas to pass therethrough. In this manner, in the gas sensor element 2, the catalyst layer 202 can be prevented from being exposed directly to the exhaust gas, and deterioration of the catalyst layer 202 can be prevented.

The function of one constituent element in the above embodiments may be distributed to a plurality of constituent elements, or the functions of a plurality of constituent elements may be realized by one constituent element. Part of the configuration of each of the above embodiments may be omitted. Also, at least part of the configuration of each of the above embodiments may be added to or partially replace the configurations of other embodiments. Notably, all modes included in the technical idea specified by the wording of the claims are embodiments of the present disclosure.

The invention claimed is:

1. A gas sensor element for detecting a specific gas contained in a subject gas, the gas sensor element comprising:
   a solid electrolyte body having oxygen ion conductivity;
   a measurement electrode disposed on the solid electrolyte body so as to be exposed to the subject gas;
   a reference electrode disposed on the solid electrolyte body so as to be exposed to a reference gas,
   wherein the gas sensor element further comprises:
      a gas limiting layer which covers the measurement electrode,
      an inner protective layer formed on an outer circumferential surface of the gas limiting layer, and
      a catalyst layer formed so as to cover part of the gas limiting layer without covering the entire gas limiting layer,
   wherein the catalyst layer contains rhodium and at least one noble metal other than the rhodium, and
   wherein, in the catalyst layer, the content of the rhodium relative to the total amount of noble metal including the rhodium and the at least one noble metal other than the rhodium contained in the catalyst layer is from 70 mol % to 85 mol % inclusive.

2. The gas sensor element according to claim 1, wherein the gas sensor element includes a cylindrical closed end element body having a closed forward end portion and extending in an axial direction.

3. A gas sensor comprising:
   the gas sensor element according to claim 1; and
   a holding member that holds the gas sensor element.

* * * * *